Oct. 29, 1968 R. T. GUTZMER 3,407,948
FILM CARTRIDGE CONVEYOR AND REMOVER
Filed June 21, 1967 3 Sheets-Sheet 1

INVENTOR.
RALPH T. GUTZMER
BY
Merchant & Gould
ATTORNEYS

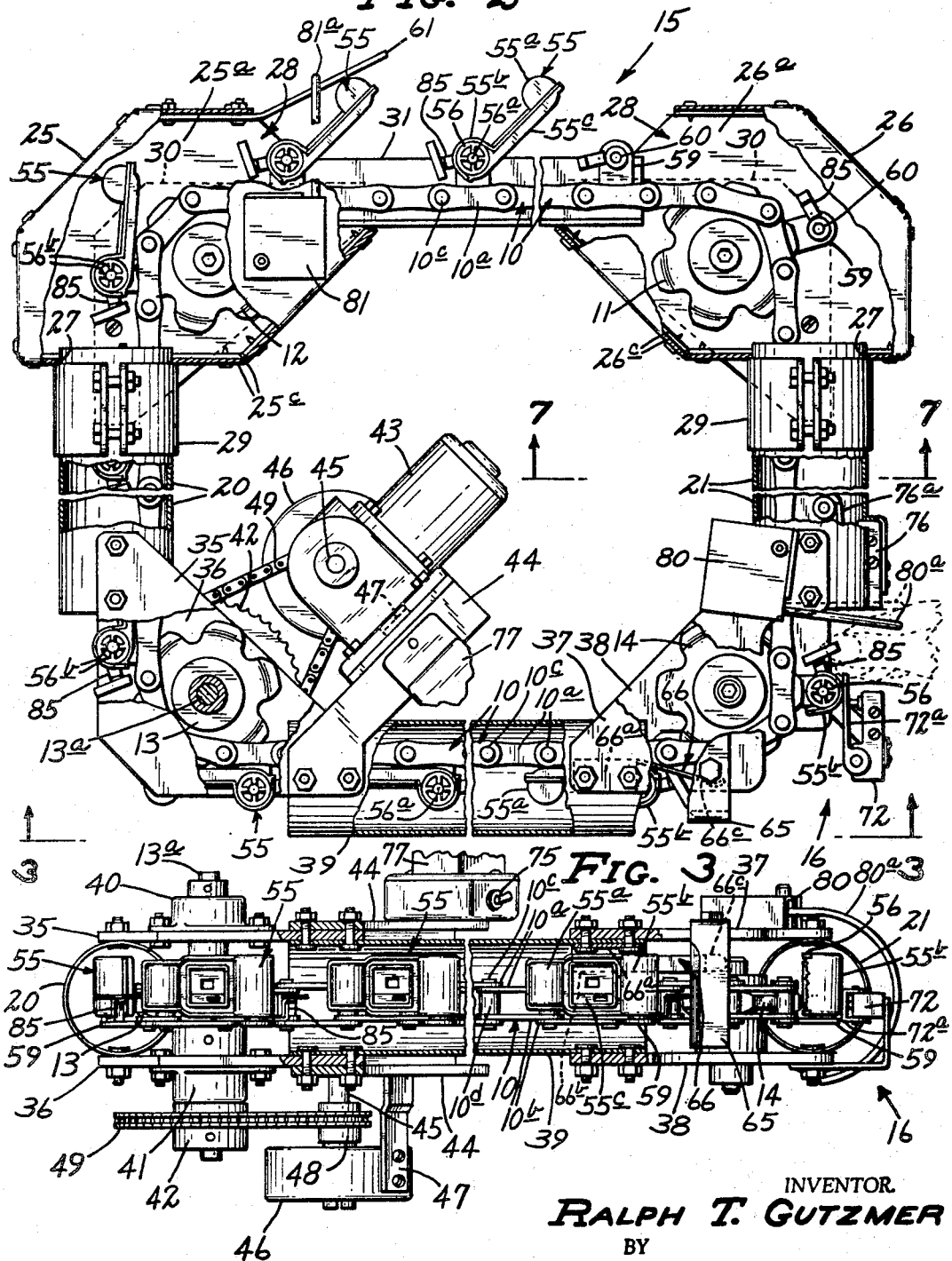

Oct. 29, 1968  R. T. GUTZMER  3,407,948
FILM CARTRIDGE CONVEYOR AND REMOVER
Filed June 21, 1967  3 Sheets-Sheet 3
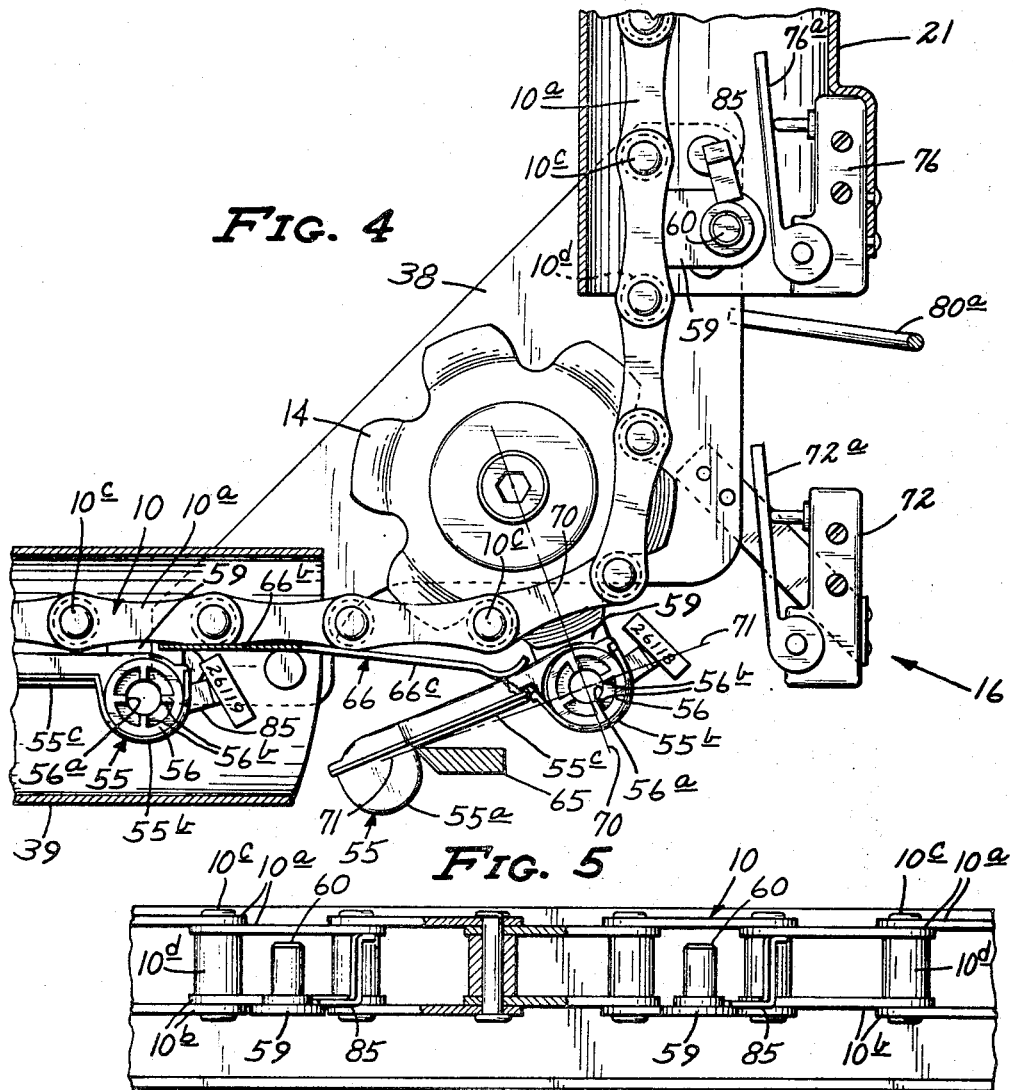
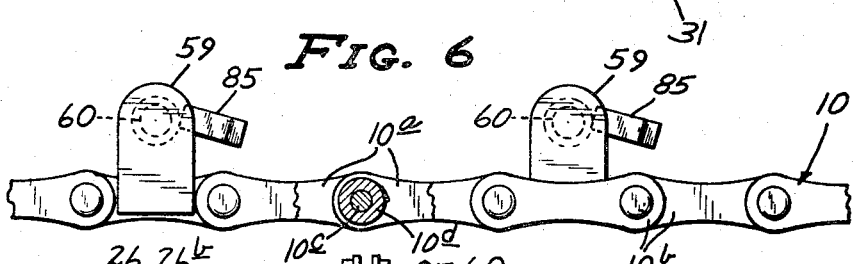
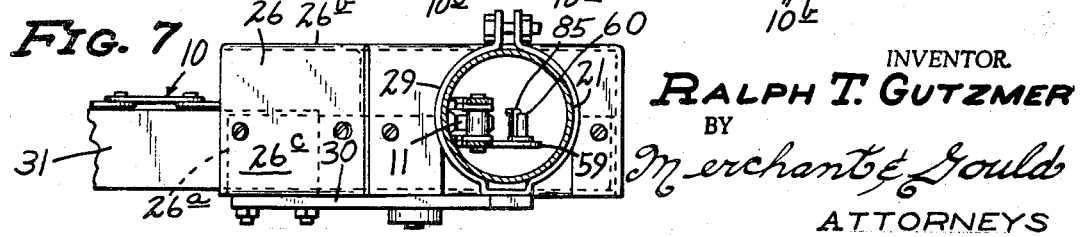
INVENTOR.
RALPH T. GUTZMER
BY
Merchant & Gould
ATTORNEYS United States Patent Office 3,407,948
Patented Oct. 29, 1968

3,407,948
FILM CARTRIDGE CONVEYOR AND REMOVER
Ralph T. Gutzmer, North St. Paul, Minn., assignor to
Vincent D. Hansen, Sr., St. Paul, Minn.
Filed June 21, 1967, Ser. No. 647,655
20 Claims. (Cl. 214—305)

ABSTRACT OF THE DISCLOSURE

An endless conveying system for carrying film cartridges, each having first and second axially parallel film carrying portions connected by a film guide portion, from a loading station to an unloading station located in a darkroom, where each cartridge is fractured and a rotatably mounted film spool carrying exposed film is removed from the second portion. As the conveyor carries the cartridge through the unloading station, a spring member pivots the cartridge about the rotatable spool to guide the first portion into engagement with a stationary abutment member to break the second portion of the cartridge away from the spool.

BACKGROUND OF THE INVENTION

Field of the invention

This invention relates generally to apparatus for handling exposed photographic film and more particularly relates to a system for automatically removing the exposed film carrying spool from a film cartridge to make the film available for processing.

Description of the prior art

In recent years, much work has been done in the area of noncommercial photographic equipment to simplify the use of such equipment. The purpose of such effort is to broaden the popular usage of such equipment by making it possible for even those who are not technically inclined to use the equipment. One important and popular innovation has been that of a self-contained film catridge unit. With this type of unit, the unexposed film is inserted in the cartridge at the factory and is not removed from the cartridge until the film has been exposed and sent to a developer. Thus, the user merely inserts the entire cartridge into the camera, exposes the film in the normal manner, and then removes the cartridge from the camera for subsequent development of the exposed film. The usual problems of threading the film in the camera are eliminated, and there is a little chance film will be exposed by the user.

A self-contained film cartridge unit of this type is manufactured and sold by the Kodak Company for use in the "Instamatic" camera. This particular unit includes a pair of spaced apart axially parallel film carrying portions connected by a flat film guide portion. When the unit is manufactured, the unexposed film is stored in the first portion and an empty film spool is rotatably mounted in the second portion. The entire film cartridge is placed in the camera where the empty spool engages the film winding mechanism of the camera. As the film is exposed, it is wound on the spool by the camera. Thus, the entire roll of exposed film is thus eventually taken up by the film spool. The entire cartridge is then removed from the camera and sent out for developing.

Before the film can be developed in the normal manner, the film spool, carrying the exposed film, must be removed from the film cartridge. Since the film cartridge is manufactured from a plastic material and is not intended to be reusuable, the usual practice is to break the cartridge apart to remove the film spool from the second portion. In the past, this breaking of the cartridge has been done by hand on an individual unit basis.

In some cases, a special tool has also been utilized to facilitate fracturing the cartridge. This prior art tool includes a pin for mounting the spool so that the cartridge can be pivoted about the spool and pin. A fixed bar is then positioned at the point where the guide portion joins the second spool carrying portion of the cartridge. The cartridge is then rotated by hand about the pin until the guide portion comes in contact with the fixed bar. When further pressure is applied, the guide portion of the cartridge fractures adjacent its connection with the second spool carrying portion.

These prior art methods of fracturing the cartridge are quite tedious and time consuming, especially when the operation is carried out in a darkroom where it is difficult for the operator to see what he is doing. Further, the cartridges do not always fracture at a position where the film spool can easily be removed. Thus, in view of the time and expense involved in fracturing the cartridges to remove the spool, some means of automating this removal of the spool from the cartridge was needed.

SUMMARY OF THE INVENTION

The present invention provides apparatus for automatically conveying the film cartridges into a darkroom where each cartridge is automatically fractured to remove the film spool. To achieve these ends, an endless conveyor is provided that extends between a loading station outside the darkroom and an unloading station in the darkroom. The conveyor carries a plurality of vertically extending pins for carrying the filb cartridges. Each cartridge is placed on the conveyor at the loading station with a pin extending upwardly into an axial opening in the film spool. The film cartridge is thus pivotally mounted on the pin. The cartridges are then carried by the conveyor to the unloading station in the darkroom with the film guide portion and the first portion of the cartridge trailing behind the second spool carrying portion. At the unloading station, the trailing end of the cartridge is swung outwardly to guide the first portion of the cartridge into engagement with a stationary abutment means mounted adjacent the conveyor. Since the conveyor is moving when this engagement takes place, the cartridge is fractured so that the spool itself can be romoved from the pin by an operator located in the darkroom.

It is therefore a primary object of the present invention to provide apparatus for automatically fracturing a film cartridge to remove the film spool from the cartridge.

Further objects and advantages of the present invention will become apparent from the following description as applied to the accompanying drawings.

BRIEF DESCRIPTION OF THE DRAWINGS

FIGURE 2 is an enlarged detail view in top plan, portions thereof being broken away and shown in section;

FIGURE 3 is a side elevational view as seen from line 3—3 of FIGURE 2, portions thereof being broken away and shown in section;

FIGURE 4 is a greatly enlarged view of the unloading station shown in FIGURE 1, portions thereof being broken away and shown in section;

FIGURE 5 is an enlarged side elevational view of a portion of the loading station as seen from line 5—5 of FIGURE 1, portions thereof being broken away and shown in section;

FIGURE 6 is a bottom plan view of the structure shown in FIGURE 5, portions thereof being broken away and shown in section;

FIGURE 7 is a transverse sectional view as seen from line 7—7 of FIGURE 2;

3

Figure 8:
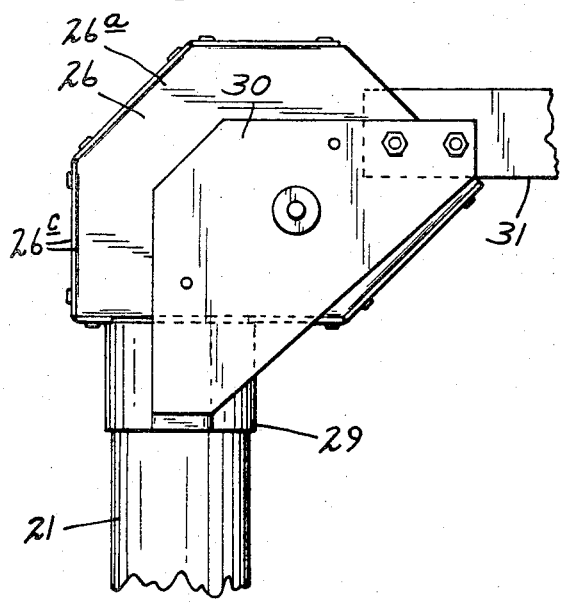

FIGURE 8 is a bottom plan view of the structure shown in FIGURE 7; and

Figure 9:
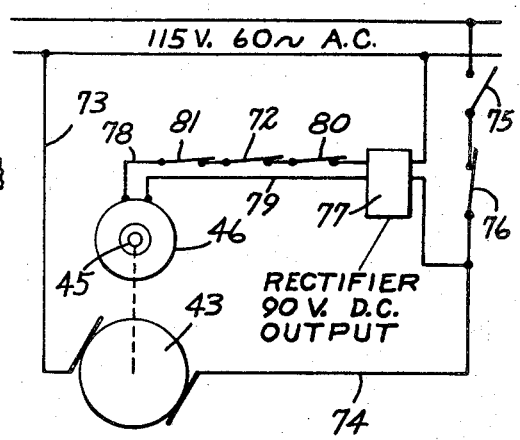

FIGURE 9 is a schematic diagram of the electrical control circuitry utilized to control the operation of the apparatus of my invention.

Figure 1:
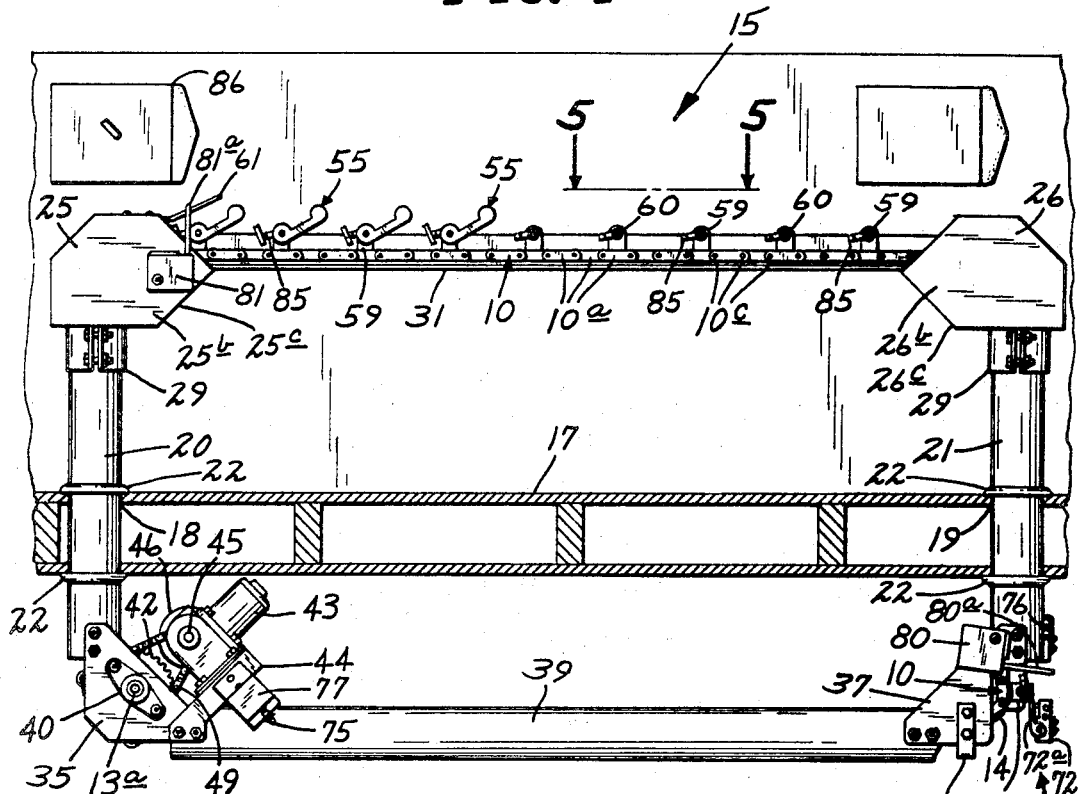
FIGURE 1 is a top plan view of my invention showing a loading station and an unloading station separated by a darkroom wall.

Referring now to the drawings, wherein like parts of the structure are identified by like numerals throughout the several views, there is disclosed an endless chain conveyor 10 that moves in a counterclockwise direction as viewed in FIGURE 1. In the preferred embodiment, conveyor 10 is constrained to move along a predetermined path of travel by sprocket wheels 11, 12, 13, and 14. Conveyor 10 itself is an endless link chain having a plurality of upper links 10a and a like plurality of lower links 10b connected by pins 10c. The upper and lower links are spaced a fixed distance apart by means of tubular spacing members 10d mounted on pins 10c. Members 10d are spaced apart so as to mesh with the teeth on sprocket wheels 11, 12, 13 and 14 to thereby support and drive conveyor 10.

As best shown in FIGURE 1, conveyor 10 moves along a predetermined path between a loading station, designated 15, and an unloading station designated 16. Unloading station 16 is located in a darkroom and is separated from loading station 15 by a darkroom wall 17. Unloading station 16 is therefore shielded from undesirable sources of light.

Darkroom wall 17 is provided with a pair of spaced apart openings 18 and 19 through which conveyor 10 travels. The supporting structure for conveyor 10 includes a pair of tubular conduit members 20 and 21 extending through openings 18 and 19 perpendicular to wall 17. Conduit members 20 and 21 are securely attached to wall 17 and each is provided with a pair of annular baffle plates 22 to prevent the entrance of light between the conduit member and the wall.

In order to prevent light from directly entering conduit members 20 and 21 at loading station 15, a pair of light blocking devices 25 and 26 are provided. Light blocking device 25 is mounted on the end of conduit member 20 while light blocking device 26 is mounted on the end of conduit member 21. Light blocking devices 25 and 26 are walled enclosures having corresponding base portions 25a, 26a, top portions 25b, 26b, and side walls 25c, 26c. Side walls 25c and 26c each have a pair of openings 27 and 28 formed therein. Openings 27 are circular in cross section and slightly larger than conduit members 20 and 21. Openings 28 have a rectangular cross section and face generally toward each other at loading station 15.

A clamping ring 29 is securely attached to the end of each of the conduit members 20 and 21 at loading station 15. Welded to the bottom of each clamping ring 29 is a generally triangular steel plate 30. An angle iron 31 extends between the oppositely disposed plates 30 at loading station 15. Each end of angle iron 31 is bolted to one of the horizontally extending plates 30 as shown in FIGURE 8.

Sprocket wheels 11 and 12 are rotatably mounted on oppositely disposed plates 30 to support conveyor 10 as best shown in FIGURE 2. Light blocking device 26 is bolted to plate 30 and positioned to surround sprocket wheel 11, with conduit member 21 extending through opening 27 therein. Opening 28 is offset from the opening in conduit member 21 to prevent the direct entrance of light therein.

Light blocking device 25 is bolted to the top of the other plate 30 to surround sprocket wheel 12, with conduit member 20 extending into opening 27 therein. Again, opening 28 in light blocking device 25 is offset from the opening in conduit member 20.

Within the darkroom, the supporting structure includes a pair of generally triangular steel plates 35 and 36 that are bolted to the top and bottom of the end of conduit member 20. A similar pair of steel plates 37 and 38 are bolted to the top and bottom of the end of conduit member 21. Plates 35 and 37 thus lie in a horizontal plane extending across the tops of conduit members 20 and 21 while plates 36 and 38 lie in a lower horizontal plane extending across the bottoms of conduit members 20 and 21. The supporting structure further includes a tubular conduit member 39, one end of which is bolted to plates 35 and 36 and the other end of which is bolted to plates 37 and 38. Conveyor 10 thus extends through light blocking device 25, through conduit members 20, 39, and 21, and through light blocking device 26.

The drive sprocket for conveyor 10 is sprocket wheel 13. Sprocket wheel 13 is mounted on a vertically extending shaft 13a. Drive shaft 13a is mounted in an upper bearing assembly 40 bolted to plate 35 and a lower bearing assembly 41 bolted to plate 36. Secured to the bottom end of shaft 13a is a drive gear 42. When drive gear 42 is rotated, shaft 13a is also rotated in bearing assemblies 40 and 41 to cause the rotation of sprocket wheel 13.

Drive gear 42 is driven by an electric motor 43 mounted on a bracket assembly 44 secured to plates 35 and 36. Extending downwardly from motor 43 is a drive shaft 45. Drive shaft 45 extends downwardly into a conventional magnetic clutch assembly 46 which is secured to bracket assembly 44 by an arm 47. An output gear 48 of clutch 46 is connected to drive gear 42 by means of a drive chain 49. When motor 43 and clutch 46 are energized, the rotation of shaft 45 causes the rotation of output gear 48 through clutch 46. The rotation of output gear 48 is imparted to drive gear 42 by means of drive chain 49.

Before discussing the remainder of the structure at unloading station 16, the film cartridge itself will be described. Each film cartridge 55 includes a first film carrying portion 55a and a second film carrying portion 55b that are connected by a film guide portion 55c. First portion 55a and second portion 55b are mounted in an axially parallel, spaced apart relationship at the opposite ends of film guide portion 55c. Rotatably mounted in second portion 55b is a film spool 56. When film cartridge 55 is manufactured, the unexposed rool of film is mounted in first portion 55a with one end of the film extending through guide portion 55c and attached to film spool 56. As the photographs are taken, the exposed film is rolled up on spool 56 by the camera. As shown in FIGURE 3, one face of film guide portion 55c has a rectangular opening therein through which the film is exposed when the picture is taken. The opposite face of film guide portion 55c has a smaller rectangular opening therein facing the back of the camera, through which the film number can be seen by the user of the camera.

Second portion 55b of cartridge 55 covers only the film carrying portion of spool 56. The opposite ends of second portion 55b are open so that the ends of spool 56 are available. Each end of film spool 56 has an axially extending opening 56a formed therein. Surrounding the outer end of opening 56a are a plurality of axially extending web members 56b that mesh with the drive mechanism of the camera to rotate spool 56.

First portion 55a and second portion 55b of film cartridge 55 are both tangentially connected to film guide portion 55c so that they are laterally offset in the same direction therefrom. Thus, a plane extending through the axes of first portion 55a and second portion 55b would be laterally offset from a plane extending through guide portion 55c.

The structure for mounting film cartridge 55 on conveyor 10 is as follows. In the preferred embodiment, every third lower link 10b is provided with a laterally outwardly extending support member 59 which is welded or otherwise attached thereto. Attached to the end of support member 59 opposite its connection with conveyor 10 is an upwardly extending pin 60. Pin 60 is spaced from conveyor 10 a distance greater than the radius of second portion 55b of cartridge 55. As shown in the drawings, the cartridges 55 are mounted on conveyor 10 at loading station 15 with a pin 60 extending upwardly into opening 56a in spool 56 to support cartridge 55 on conveyor 10. Cartridges 55 are mounted on conveyor 10 such that guide portion 55c and first portion 55a trail behind second portion 55b as the conveyor 10 moves in a counter clockwise direction from loading station 15 to unloading station 16. Further, in the preferred embodiment, first portion 55a and second portion 55b face outwardly from conveyor 10 with film guide portion 55c lying closely adjacent conveyor 10. In order to insure that cartridge 55 will lie closely adjacent conveyor 10 during its travel, light blocking device 25 is provided with a plate 61 extending from the outer edge of opening 28 therein. Plate 61 flares outwardly from opening 28 and is positioned to engage first portion 55a as cartridge 55 enters opening 28 in light blocking device 25. Since the inner end of plate 61 is closer to conveyor 10 than is the outer end of plate 61, cartridge 55 is gradually pivoted about pin 60 so that it lies against conveyor 10 during its passage through light blocking device 25, and conduit members 20 and 39.

Assuming that conveyor 10 is moving in a counter clockwise direction, each film cartridge 55 that is placed on a pin 60 at loading station 15 will be carried by conveyor 10 to unloading station 16 in the darkroom. Light blocking devices 25 and 26, together with conduit members 20 and 21 effectively prevent the entrance of unwanted light into the darkroom. When each cartridge 55 reaches unloading station 16, it is desired to fracture the cartridge to remove film spool 56 from the cartridge.

The apparatus for fracturing the cartridge will now be described. Mounted adjacent the path of travel of film cartridge 55 at unloading station 16 is a stationary, knife-like abutment member 65. Abutment member 65 is an L-shaped member, the horizontal leg of which is bolted to plate 37 and the vertical leg of which extends downwardly therefrom opposite the path of travel of cartridge 55 from conveyor 10. Abutment member 65 is positioned a sufficient distance from conveyor 10 so that second portion 55b will not engage therewith during its travel with conveyor 10. Also mounted at unloading station 16 is a flat spring member 66. Spring member 66 has a horizontally disposed upper portion 66a that is bolted to the inside of the upper wall of conduit member 39. Spring member 66 also includes a vertically disposed support portion 66b that extends downwardly from portion 66a opposite the path of travel of cartridge 55 from abutment 65. Extending outwardly from support portion 66b in the direction of travel of cartridge 55 is a spring portion 66c. Spring portion 66c is normally positioned in the path of travel of cartridge 55. Second portion 55b of cartridge 55 therefore engages spring portion 66c during its travel to displace it in a direction away from abutment member 65. Spring portion 66c is biased to return to its normal position in the path of travel of cartridge 55 after the passage of second portion 55b thereby.

As conveyor 10 carries second portion 55b past spring portion 66c, guide portion 55c and first portion 55a of cartridge 55 continue to trail behind as previously described. As soon as second portion 55b moves beyond the free end of spring portion 66c, however, spring portion 66c returns to its normal position carrying the trailing portions of cartridge 55 with it. Spring portion 66c presses against the back of guide portion 55c generally at the area where guide portion 55c joins second portion 55b. Cartridge 55 is thus pivoted about pin 60 with first portion 55a moving outwardly away from conveyor 10. As conveyor 10 continues to move, first portion 55a swings outwardly and engages abutment member 65 as shown in FIGURE 4. The knife-like edge of vertical abutment member 65 engages cartridge 55 generally along the juncture of first portion 55a with guide portion 55c. Since conveyor 10 is still moving, the distance between stationary abutment member 65 and pin 60 increases to place a disruptive force on cartridge 55. First portion 55a is held stationary while spool 56 continues to move, thereby fracturing the cartridge from the spool.

In the preferred embodiment of the invention, abutment member 65 is positioned such that it engages first portion 55a just as second portion 55b begins to be carried around sprocket wheel 14. Thus, spool 56 is no longer traveling in a straight line, but has begun to curve to the left in a direction away from abutment member 65. As shown in FIGURE 4, each pin 60 is carried by support member 59 through an arc of 90° as it travels around sprocket wheel 14. At the time first portion 55a engages abutment member 65, this change in direction of pin 60 has just begun as evidenced by the position of the support member 59 in FIGURE 4.

Since cartridge 55 is constructed from a solid plastic material, it fractures almost instantaneously when the disruptive force is applied. Since the fracture is almost instantaneous, the disruptive force can be considered as being applied along a straight line even though pin 60 is moving in an arc about sprocket wheel 14. The disruptive force is applied by pin 60 against the leading edge of axial opening 56a in film spool 56. At the instant the fracture occurs, pin 60 is moving in a direction perpendicular to a line extending through the axis of spool 56 and the axis of sprocket wheel 14. This line is identified by the numeral 70 in FIGURE 4. The direction of travel of pin 60 at this instant is identified by the line 71 in FIGURE 4. It is noted that if a vertical plane is extended through line 71, the plane intercepts the axis of film spool 56 and also intercepts the area at which abutment member 65 engages cartridge 55.

Since the force is being applied in line 71, abutment member 65 exerts what might be described as a shearing action against the juncture of first portion 55a and film guide portion 55c. As opposed to this shearing force, however, the juncture of film guide portion 55c with second portion 55b is subjected to a twisting action or torque since the line of force is offset from the juncture of film guide portion 55c and second portion 55b. Since the juncture of film guide portion 55c with second portion 55b is laterally offset from the line of force being applied, a multiplication of forces occur that causes cartridge 55 to fracture at this point. Since abutment member 65 engages first portion 55a on or near the line of applied force, however, no multiplication of forces occurs at this point. The fracture therefore occurs at the point where the greatest amount of force is applied, at the juncture of film guide portion 55c and second portion 55b. Although the cartridge 55 will fracture if force is applied along a line other than line 71, the most effective and consistent results are obtained if the force is applied as described above.

After cartridge 55 has been fractured at unloading station 16, pin 60 carries spool 56 around sprocket wheel 14 until it engages a switch arm 72a of a normally closed electrical switch 72. Switch 72 is mounted on plate 38 with switch arm 72a lying in the path of spool 56. When switch arm 72a is depressed by spool 56, switch 72 is opened to deenergize clutch 46. Conveyor 10 thus stops.

Referring now to FIGURE 9, there is disclosed a schematic diagram of the control circuitry for conveyor 10. Motor 43 is connected directly across a suitable 115 volts 60 cycle AC source by a pair of conductors 73 and 74. Connected in series with conductor 74 is a manually operated control switch 75 and a normally closed safety switch 76. Connected in parallel with motor 43 and also controlled by switches 75 and 76 is a rectifier 77 having a 90 volt DC output. Connected to the output of rectifier 77 by a pair of conductors 78 and 79 is the clutch 46. Connected in series with conductor 78, to control clutch 46, are three normally closed switches 72, 80, and 81. The opening of any one of the switches 72, 80, or 81 will deenergize clutch 46 to stop conveyor 10. If either switch 75 or switch 76 is opened, both the clutch 46 and motor 43 are deenergized.

Switch 75 is the main control switch for the system and is mounted directly on bracket assembly 44 adjacent motor 43. Switch 76 is a normally closed safety switch mounted on the end of conduit member 21 at unloading station 16. Switch 76 has a switch arm 76a that is positioned adjacent the path of travel of pins 60, as best shown in FIGURE 4. Pins 60 will not operate switch arm 76a, but if a spool 56 is not removed from a pin 60, spool 56 will depress switch arm 76a to deenergize motor 43 until spool 56 is removed from the pin. Safety switch 76 thus prevents spools of unexposed film from being carried out in the darkroom into the lighted loading area 15. Under normal conditions, however, safety switch 76 will never be used since the depression of switch arm 72a by film spool 56 opens switch 72 to stop the conveyor until an operator at unloading station 16 removes the film spool from the pin. As soon as the film spool is removed from the pin, switch arm 72a returns to its normal position to energize clutch 46 to start conveyor 10.

Normally closed switch 81 is mounted on the top plate 25b of light blocking device 25. Switch 81 includes a switch arm 81a that extends outwardly over the top of and perpendicular to conveyor 10. The free end of switch arm 81a extends over and downwardly behind plate 61. Plate 61 is constructed from a rather flexible sheet metal so that if a cartridge or other object should cause an obstruction upon entering opening 28, plate 61 will be depressed outwardly to actuate switch arm 81a. When switch arm 81a is actuated, switch 81 opens to deenergize clutch 46. Of course, switch arm 81a can also be operated by hand to stop conveyor 10.

Before discussing switch 80, it is noted that each support member 59 on conveyor 10 is provided with an outwardly and upwardly extending shelf member 85. Shelf member 85 is welded or otherwise attached to support member 59. The purpose of shelf member 85 is to carry a gummed identification tag for the film cartridge. As shown in FIGURE 1, when the operator at loading station 15 places cartridge 55 on pin 60, he also places a gummed label on shelf member 85 and a similar gummed label on an envelope 86. The two gummed labels carry the same number and the envelope 86 carries the name and address of the owner of the film. The gummed label is thus carried by conveyor 10 to unloading station 16 where it is removed by the operator at the same time as spool 56 is removed. The gummed label is then attached to the spool to identify the film. To provide added safety for the operator at unloading station 16 during the removal of the film spool and label, switch 80 is mounted on plate 37. Switch 80 is provided with a switch arm 80a that extends outwardly over conveyor 10 between switches 72 and 76. As shown in FIGURE 2, when an operator inserts his fingers to remove spool 56 and the gummed label, his hand depresses switch arm 80a to prevent clutch 46 from being energized.

The sequence of operation of the system is as follows. Assume that conveyor 10 is empty and that an operator is present both at loading station 15 and at unloading station 16. The operator at unloading station 16 then closes switch 75 to energize the motor 43 and clutch 46, all of the other switches being closed. The operator at loading station 15 places a cartridge 55 on each pin 60, as shown in FIGURE 1. At the same time, the operator at loading station 15 places a gummed label on shelf member 85 and a correspondingly numbered gummed label on the identification carrying envelope 86. Cartridges 55 are then carried in a counterclockwise direction by conveyor 10 into the darkroom. As each cartridge 55 passes plate 61, it is rotated about pin 60 so that cartridge 55 lies closely adjacent conveyor 10.

When each cartridge 55 reaches unloading station 16, spring portion 66c forces the trailing film guide portion 55c outwardly to guide first portion 55a into engagement with abutment member 65. At the time cartridge 55 engages abutment member 65, pin 60 is beginning its change in direction of travel about sprocket wheel 14, as shown in FIGURE 4. Cartridge 55 thus fractures as shown in FIGURE 4, and drops away from conveyor 10. Pin 60 and film spool 56 continue their travel until spool 56 depresses switch arm 72a, opening switch 72 to deenergize clutch 46. Conveyor 10 then stops. The operator at unloading station 16 then removes spool 56 from pin 60 and also removes the gummed label from shelf member 85. The operator depresses switch arm 80a during this operation to assure that conveyor 10 does not immediately start when spool 56 is removed from pin 60. When the operator removes his hand, both switch 72 and switch 80 are closed so that clutch 46 is again energized to start conveyor 10. The sequence of events then repeats with the next cartridge being fractured and the conveyor again stopping when the spool depresses switch arm 72a.

The above sequence of events is repeated as fast as the operator at unloading station 16 can remove the spool and gummed label from the conveyor. Either operator can stop the conveyor if it becomes necessary to do so. Utilizing this system, the film spools can be quickly and accurately removed from the cartridges for subsequent development processes.

The above description of my invention has been made in connection with a specific film cartridge design. Further, the system has been designed to fracture this cartridge consistently at an optimum point to remove the film spool therefrom.

I claim:

1. Apparatus for fracturing a film cartridge to remove a film spool from the cartridge, the cartridge having first and second axially parallel film carrying portions connected by a film guide portion adapted to guide the transfer of film from the first portion to the film receiving spool rotatably mounted in the second portion, comprising:
   (a) a supporting structure;
   (b) abutment means mounted on said supporting structure;
   (c) carrier means mounted on said supporting structure for axially mounting the film spool of the film cartridge to convey the film cartridge along a predetermined path of travel; and
   (d) means including said carrier means for engaging the first portion of the film cartridge with said abutment means during travel of the cartridge along said predetermined path to fracture the cartridge.

2. The apparatus of claim 1 wherein said carrier means is an endless chain conveyor, wherein said supporting structure includes a plurality of sprocket wheels engaging said conveyor, one of said sprocket wheels being a drive wheel, and wherein said means mounting the spool includes a laterally outwardly extending support member attached to said conveyor having pin means attached thereto extending upwardly therefrom to engage an axial opening in the spool.

3. The apparatus of claim 2 wherein the film guide portion and the first portion normally trail behind the second portion during movement of the cartridge along said path of travel, wherein said abutment means is positioned adjacent said path of travel, and wherein means are provided to pivot the film cartridge about said pin means to engage the first portion thereof with said abutment means.

4. The apparatus of claim 1 wherein said carrier means includes an endless conveyor having a loading station and an unloading station, and wherein means are provided to shield said unloading station from undesirable sources of light.

5. The apparatus of claim 4 wherein said unloading station is situated in a darkroom with a wall of said darkroom being positioned between said loading and said unloading stations, wherein said wall is provided with a pair of spaced apart openings through which said endless conveyor travels, and wherein shielding means are provided to prevent light from passing through said openings in said wall.

6. The apparatus of claim 5 wherein said shielding means include a pair of tubular conduit members extending through said pair of openings in said wall, said conduit members forming a part of said supporting structure and carrying said endless conveyor therethrough, said shielding means further including light blocking means mounted on the end of each of said conduit members at said loading station to prevent light from directly entering said conduit members.

7. The apparatus of claim 6 wherein said supporting structure for said endless conveyor includes a sprocket wheel mounted at each end of each of said conduit members, one of said sprocket wheels being a drive wheel, said endless conveyor thereby changing its direction of travel at each of said sprocket wheels to follow a generally rectangular path of travel, and wherein each of said light blocking means comprises a walled enclosure surrounding said corresponding sprocket wheel having first and second openings formed therein through which said endless conveyor travels, said first opening being aligned with said conduit member and said second opening being offset therefrom.

8. The apparatus of claim 1 wherein said means for mounting the film spool includes vertically extending pin means mounted on said carrier means, the spool having an axial opening therein into which said pin means extends to support the spool and film cartridge for travel with said carrier means.

9. The apparatus of claim 8 wherein said supporting structure includes means mounted thereon for pivoting the film cartridge about said pin means to engage the first portion thereof with said abutment means.

10. The apparatus of claim 9 wherein said means for pivoting the film cartridge includes a spring member positioned on said supporting structure in said path of travel, said spring member being displaceable from said path of travel by the second portion of the film cartridge, said spring member being biased to return to its normal position in said path of travel after the passage of the second portion to pivot the film cartridge about said pin means.

11. The apparatus of claim 10 wherein said abutment means is a stationary, vertically extending knife-like member positioned adjacent said path of travel, said knife-like member engaging the first portion at the juncture of the first portion with the film guide portion.

12. The apparatus of claim 1 wherein said means mounting the film spool is provided with a shelf member for carrying a numbered label to identify the film spool.

13. The apparatus of claim 1 wherein said carrier means is an endless conveyor mounted on a plurality of sprocket wheels, one of said wheels being a drive wheel, wherein motor means are provided to operate said drive wheel, wherein said endless conveyor has a loading station and an unloading station, wherein a source of power is provided to operate said motor means, and wherein switching means are provided at said loading station and at said unloading station to connect said source to said motor means.

14. The apparatus of claim 13 wherein a first normally closed switch means is mounted at said unloading station adjacent said endless conveyor, said first switching means having a switch arm thereon positioned in the path of travel of the film spool after its removal from the film cartridge, said moving film spool depressing said switch arm to open said first switching means to disconnect said motor means from said source, said first switching means returning to its normally closed position upon the removal of the spool from said endless conveyor.

15. Apparatus for fracturing a film cartridge to remove a film receiving spool from the cartridge, the cartridge having first and second axially parallel film carrying portions connected by a film guide portion laterally offset from a plane extending through the axes of the first and second portions, the film spool being rotatably mounted in the second portion and having an axially extending opening formed in at least one end thereof, said apparatus comprising:
 (a) an endless conveyor having a loading station and an unloading station;
 (b) means for mounting the film cartridges on said conveyor at said loading station including a plurality of upwardly extending pins mounted on said conveyor, the axially extending opening in each spool being placed over one of said pins;
 (c) means for driving said conveyor in a predetermined direction along a predetermined path to carry the film cartridges from said loading station to said unloading station;
 (d) stationary abutment means mounted at said unloading station; and
 (e) means for guiding the first portion of the film cartridge into contact with said abutment means while said conveyor is moving along siad predetermined path to fracture the film cartridge to break away the cartridge from the spool.

16. The apparatus of claim 15 wherein the film cartridge is guided into contact with said abutment means generally along the juncture of the first portion with the guide portion by a spring member positioned in the path of travel of the cartridge and biased to pivot the film cartridge toward said abutment means after the passage of the second portion thereby.

17. The apparatus of claim 15 wherein an idler sprocket wheel is mounted at said unloading station to carry said conveyor, said conveyor being mounted thereon and following a curved path around said sprocket wheel, and wherein said abutment means is positioned such that said second portion is being carried by said conveyor along said curved path at the time the first portion engages said abutment means.

18. The appaartus of claim 15 wherein the film cartridge is guided into contact with said abutment means generally along the juncture of the first portion with the guide portion and wherein said predetermined path of travel is such that the force tending to fracture the cartridge is applied to the axis of the spool by said pin generally along a plane intersecting the axis of the spool and the juncture of the first portion with the guide portion.

19. Apparatus for fracturing a film cartridge to remove a film receiving spool from the cartridge, the cartridge having first and second axially parallel film carrying portions connected by a film guide portion laterally offset from a plane extending through the axes of the first and second portions, the film spool being rotatably mounted in the second portion, said apparatus comprising:
 (a) means for supporting the film cartridge along the axis of the spool;
 (b) abutment means positioned to engage the juncture of the first portion with the guide portion; and
 (c) means for producing relative movement between said means supporting the film cartridge and said abutment means to break away the film cartridge from the spool.

20. The apparatus of claim 19 wherein said relative movement is produced generally along a plane intersecting the axis of the spool and the juncture of the first portion with the guide portion.

References Cited

UNITED STATES PATENTS 2,463,276    3/1949    Hrabarchuk _____ 214—305

HUGO O. SCHULZ, *Primary Examiner.*